United States Patent [19]

Grass

[11] 4,052,006
[45] Oct. 4, 1977

[54] FOLDING SPRAY BOOM

[75] Inventor: Henry G. Grass, Dinuba, Calif.

[73] Assignees: James L. Grass; William H. Grass, both of Dinuba, Calif. ; part interest to each

[21] Appl. No.: 728,454

[22] Filed: Sept. 29, 1976

[51] Int. Cl.² ............................ B05B 1/20; B05B 3/14
[52] U.S. Cl. .................................. 239/168; 239/161; 239/169
[58] Field of Search ................ 239/160, 161, 166–170, 239/265

[56] References Cited

U.S. PATENT DOCUMENTS

| 2,218,776 | 10/1940 | Vaage | 239/166 X |
| 2,365,755 | 12/1944 | Griffith | 239/169 X |
| 2,564,489 | 8/1951 | Malin | 239/166 X |

*Primary Examiner*—Robert W. Saifer
*Attorney, Agent, or Firm*—Clarence A. O'Brien; Harvey B. Jacobson

[57] ABSTRACT

A mobile tank chassis is provided and includes an upstanding outlet pipe for the tank having upper and lower sections with the lower sections supported from the chassis and a union removably and sealingly coupling and supporting the lower end of the upper section on the upper end of the lower section. An elongated upright support including upper and lower portions generally parallels the pipe and hinge structure pivotally supports the lower end of the upper portion from the upper end of the lower portion for angular displacement of the upper portion relative to the lower portion about a horizontal axis between a upright position and a generally horizontal position disposed over the tank portion of the chassis. Structure is provided guidingly supporting the upper and lower portions of the support from the upper and lower sections, respectively, of the pipe for generally longitudinal shifting of the support portions relative to the corresponding pipe sections and flexible hoses communicate the pipe sections with spray nozzles spaced along the corresponding support portions. Further, drive structure is connected between the chassis and the lower support portion for longitudinally oscillating the support.

8 Claims, 6 Drawing Figures

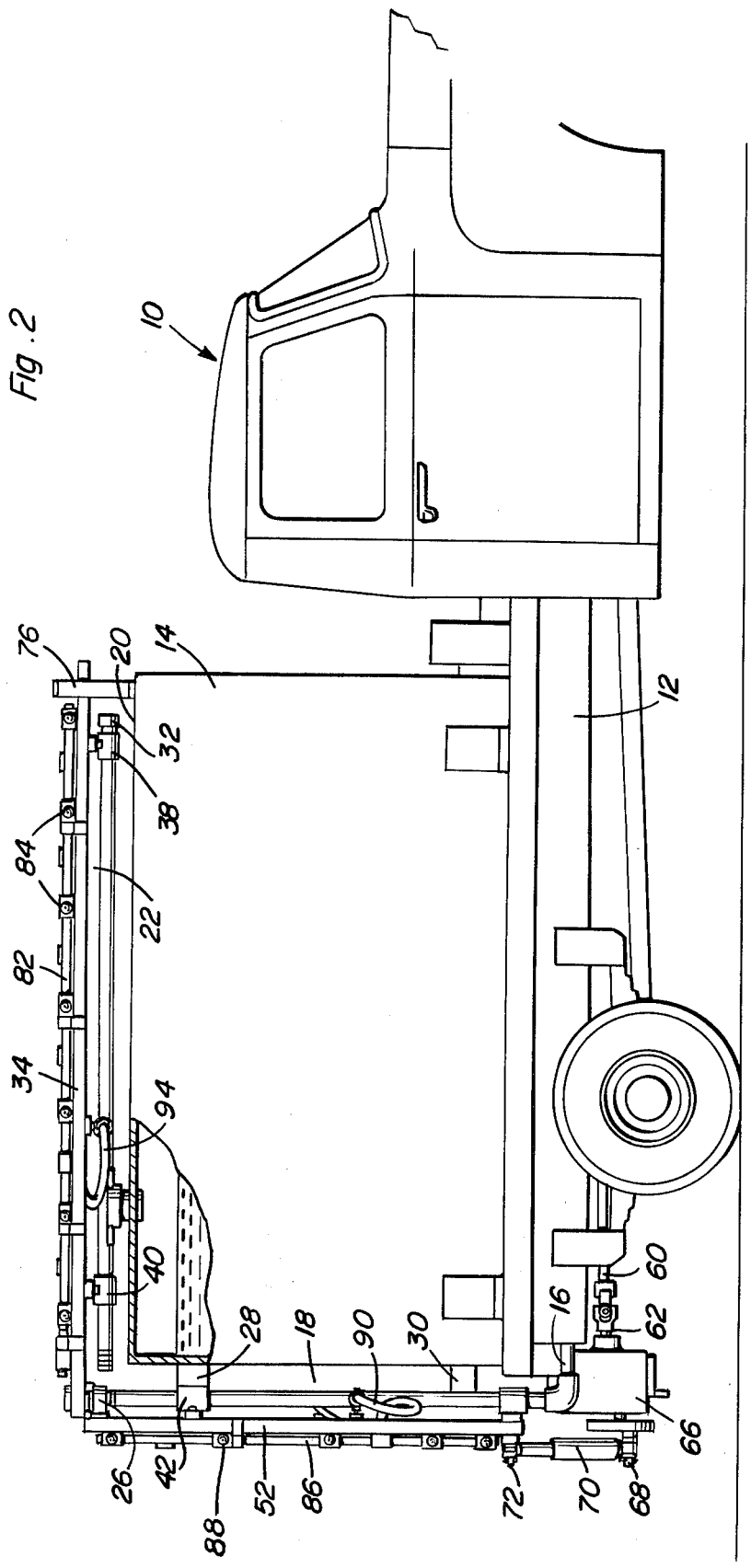
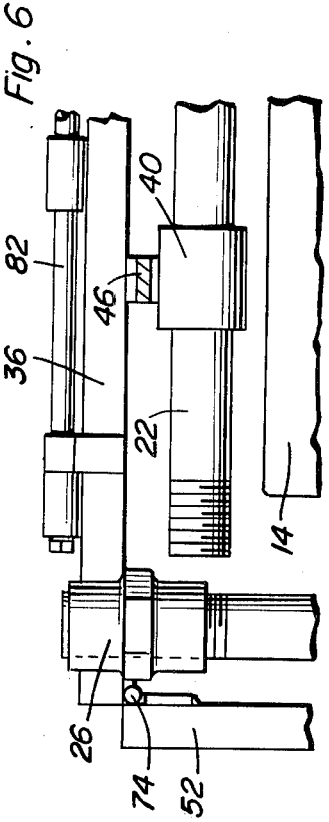
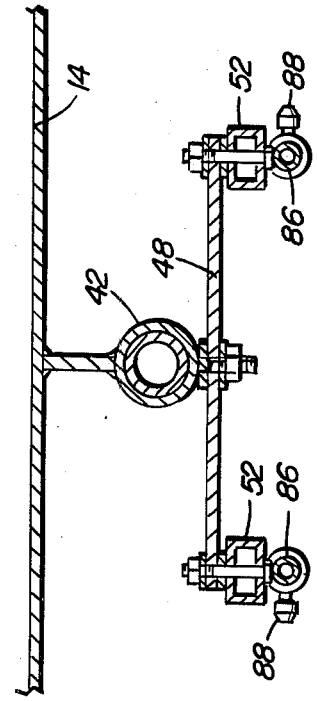

FOLDING SPRAY BOOM

BACKGROUND OF THE INVENTION

Various forms of mobile sprayers are provided for spraying trees and particularly trees which are arranged in adjacent parallel rows in an orchard.

One form of efficient mobile sprayer of this type includes an upstanding vertically oscillatable sprayer unit such as that disclosed in prior U.S. Pat. No. 2,411,964, and which projects above the tank portion of the sprayer unit to an elevation considerably above the height limitations for vehicles traveling on many highways. In addition, the upstanding sprayer unit projects above the elevation at which low telephone lines and electrical lines may extend across a highway. Accordingly, a considerable difficulty is encountered when attempting to transport mobile sprayers of this type over highways.

BRIEF DESCRIPTION OF THE INVENTION

The mobile sprayer of the instant invention includes an upstanding oscillable sprayer unit, but the upper end portion of the sprayer unit is pivotally supported from the lower portion thereof whereby the upper portion may be swung to a horizontal position closely overlying the tank portion of the sprayer unit.

The main object of this invention is to provide a mobile tree spraying unit including an efficient upstanding oscillatable sprayer unit but constructed in a manner whereby the maximum elevation of the sprayer unit may be substantially reduced for transport of the mobile sprayer unit over highways.

Another object of this invention, in accordance with the preceding objects, is to provide a mobile sprayer unit whose upper portion may be readily released from an upstanding position and pivoted to a lowered horizontal position.

Another very important object of this invention is to provide a mobile sprayer unit which may be readily adapted for use on various forms of sprayer unit mobile chassis.

A final object of this invention to be specifically enumerated herein is to provide a mobile sprayer unit in accordance with the preceding objects and which will conform to conventional forms of manufacture, be of simple construction and easy to use so as to provide a device that will be economically feasible, long lasting and relatively trouble free in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a side elevational view of the mobile sprayer unit on somewhat of a reduced scale and with the upper portion of the upstanding oscillatable sprayer assembly thereof in a lowered horizontal position overlying the tank portion of the unit;

FIG. 5 is an enlarged fragmentary horizontal sectional view taken substantially upon the plane indicated by the section line 5—5 of FIG. 1; and FIG. 6 is a side elevational view of the upper rear portion of the unit illustrated in FIG. 2 on somewhat of an enlarged scale.

DETAILED DESCRIPTION OF THE INVENTION

Figure 1:
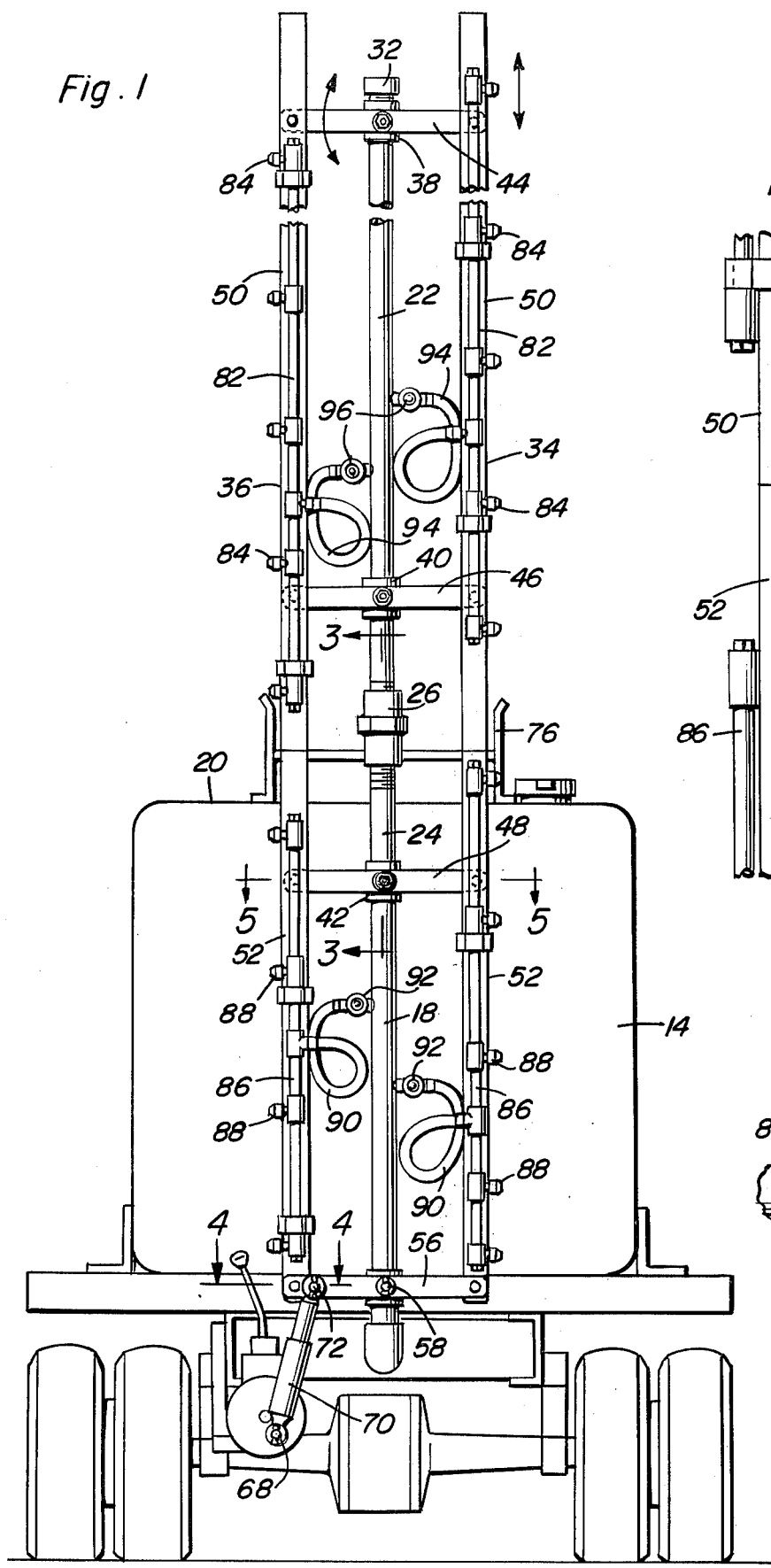
FIG. 1 is a rear elevational view of a mobile sprayer unit constructed in accordance with the present invention.
Figure 3:
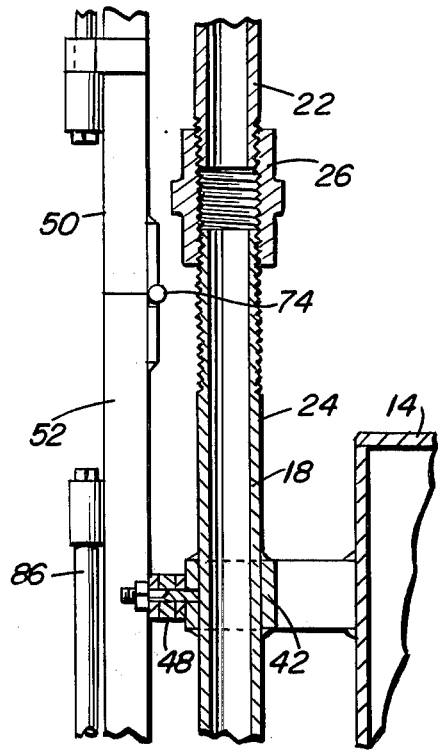
FIG. 3 is an enlarged fragmentary vertical sectional view taken substantially upon the plane indicated by the section line 3—3 of FIG. 1.
Figure 4:
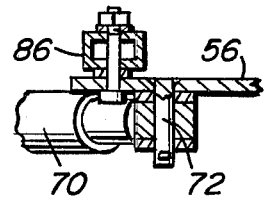
FIG. 4 is a fragmentary enlarged horizontal sectional view taken substantially upon the plane indicated by the section line 4—4 of FIG. 1.

Referring now more specifically to the drawings, the numeral 10 generally designates a mobile sprayer of generally conventional configuration. The sprayer 10 includes a mobile chassis 12 from which a liquid tank 14 is supported and the tank 14 includes an outlet pipe 16 through which liquid may be pumped by means of a pump (not shown) and including an upstanding component 18 thereof which projects upwardly behind the rear of the tank 14 to elevation spaced appreciatively above the upper wall 20 of the tank.

The pipe component 18 includes upper and lower sections 22 and 24 and a conventional union coupling 26 removably couples the lower end of the upper section 22 from the upper end of the lower section 24, the lower section 24 being supported from the chassis 12 and braced relative to the rear of the tank as at 28 and 30. Further, the upper end of the upper section 22 is capped closed as at 32.

A pair of upright supports 34 and 36 extend upwardly along and are spaced from the upstanding component 18 of the pipe 16. The component 18 includes a pair of upper and lower mounts 38 and 40 on the section 22 thereof and the section 24 includes a mount 42 of similar construction. Three parallelogram links 44, 46 and 48 are oscillatably supported from mounts 38, 40 and 42 and pivotally secured at their opposite ends to the upright supports 34 and 36. Each of the supports 34 and 36 includes upper and lower portions 50 and 52 and the ends of the links 44 and 46 are pivotally connected to the upper portions 50 while the opposite ends of the link 48 are pivotally connected to the lower portions 52 adjacent the upper ends thereof.

An oscillatable support link 56 is oscillatably supported from the chassis 12 as at 58 and has its opposite ends pivotally attached to the lower ends of the lower portions 52 of the upright supports 34 and 36.

The chassis 12 includes a power takeoff shaft 60 driven by the motor (not shown) of the mobile sprayer 10 and the power takeoff shaft 60 is coupled to the input shaft 62 of the transmission 66 supported from the chassis 12 and provided with an eccentric crank pin 68 on its output shaft. A drive arm 70, of the telescopic shock absorbing type, is pivotally connected at one end to the pin 68 and at the other end to one end portion of the link 56 as at 72. Accordingly, upon rotation of the power takeoff shaft 60, the supports 34 and 36 will be longitudinally vertically oscillated.

The lower ends of the support portions 50 are hingedly supported from the upper ends of the support portions 52 as at 74 for angular displacement of the upper portions 50 from the upstanding positions thereof illustrated in FIG. 1 of the drawings projecting considerably above the upper wall 20 of the tank 14 to the horizontal positions thereof illustrated in FIG. 2 of the drawings closely overlying the top wall 20 of the tank 14, the top wall 20 including a cradle 76 for cradling the upper section 22 of the pipe component 18 and the upper ends of the upper portions 50 of the supports 34 and 36.

The upper portions 50 of the supports 34 and 36 include manifold pipes 82 extending therealong provided with spaced spray nozzles 84 and the lower portions 52 of the supports 34 and 36 include similar manifolds 86 extending therealong provided with spaced spray nozzles 88. A pair of flexible hoses 90 having control valves 92 operatively associated therewith communicate the interior of the lower section 24 of the tank component 18 with the manifolds 86 and similar flexible hoses 94 having control valves operatively associated therewith communicate the interior of the upper section 22 of the pipe component 18 with the manifolds 82. Accordingly, upon oscillation of the supports 34 and 36 by the crank pin 68 and the pumping of liquid from the interior of the tank 14 through the component 18 of the pipe 16, the liquid within the tank 14 may be sprayed from the nozzles 84.

With attention now invited more specifically to FIG. 6 of the drawings, it may be seen that when it is desired to swing the upper section 22 and the upper portions 50 to the horizontal position thereof closely overlying the top of the tank 20, the union coupling 26 may be disengaged from the upper section 22 of the pipe component 18 whereupon the entire upper assembly comprising the upper section 22 and the portions 50 as well as the manifolds 82 supported therefrom may be swung to the horizontal position illustrated in FIGS. 2 and 6 supported from the cradles 76 and 78. Thus, the overall height of the mobile sprayer 10 may be substantially reduced from the overall height thereof illustrated in FIG. 1.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a mobile chassis, a liquid tank mounted on said chassis and having opposite ends, an upstanding outlet pipe for said tank having upper and lower sections, first means mounting said lower section from said chassis outwardly of one end thereof, second means removably and sealingly coupling and supporting the lower end of said upper section on the upper end of said lower section, an elongated upright support generally paralleling said pipe and including vertically spaced spray nozzles thereon, said upright support including upper and lower portions spaced alongside said upper and lower sections, third means pivotally attaching the lower end of said upper portion to the upper end of said lower portion for angular displacement of said upper portion relative to said lower portion about a horizontal axis between an upright position and a generally horizontal position disposed over said tank, fourth means guidingly supporting said upper and lower portions from said upper and lower sections, respectively, for generally longitudinal shifting of said portions relative to the corresponding sections, flexible means communicating said pipe sections with the spray nozzles on the corresponding support portions, means communicating the interior of said tank with the interior of said outlet pipe, and drive means connected between said chassis and said lower support portion for vertically oscillating said upstanding support.

2. The combination of claim 1 wherein said fourth means includes parallel links pivotally connected between said pipe sections and said support portions.

3. The combination of claim 2 including a second elongated spray nozzle equipped upright support generally paralleling said pipe on the side thereof remote from the first mentioned support and also including upper and lower portions pivotally connected together for angular displacement of the upper portion thereof relative to the lower portion thereof about said horizontal axis, said fourth means also guidingly supporting said second upright support upper and lower portions from said upper and lower pipe sections for longitudinal shifting relative thereto, said flexible means also communicating said pipe sections with the spray nozzles on the corresponding nozzles on said portions of said second upright support.

4. The combination of claim 3 wherein said fourth means includes parallel links pivotally connected to said pipe sections intermediate their opposite ends and at their opposite ends to the corresponding portions of said upright supports.

5. The combination of claim 1 including a second elongated spray nozzle equipped upright support generally paralleling said pipe on the side thereof remote from the first mentioned support and also including upper and lower portions pivotally connected together for angular displacement of the upper portion thereof relative to the lower portion thereof about said horizontal axis, said fourth means also guidingly supporting said second upright support upper and lower portions from said upper and lower pipe sections for longitudinal shifting relative thereto, said flexible means also communicating said pipe sections with the spray nozzles on the corresponding nozzles on said portions of said second upright support.

6. The combination of claim 5 wherein said fourth means includes parallel links pivotally connected to said pipe sections intermediate their opposite ends and at their opposite ends to the corresponding portions of said upright supports.

7. The combination of claim 1 wherein each support portion includes a manifold supported therefrom and extending therealong from spaced portions of which the corresponding nozzles are supported, said flexible means communicating said pipe sections with the corresponding manifolds.

8. The combination of claim 1 wherein said second means comprises a pipe union coupling releasably connected between said pipe sectons.

* * * * *